Patented Mar. 10, 1942

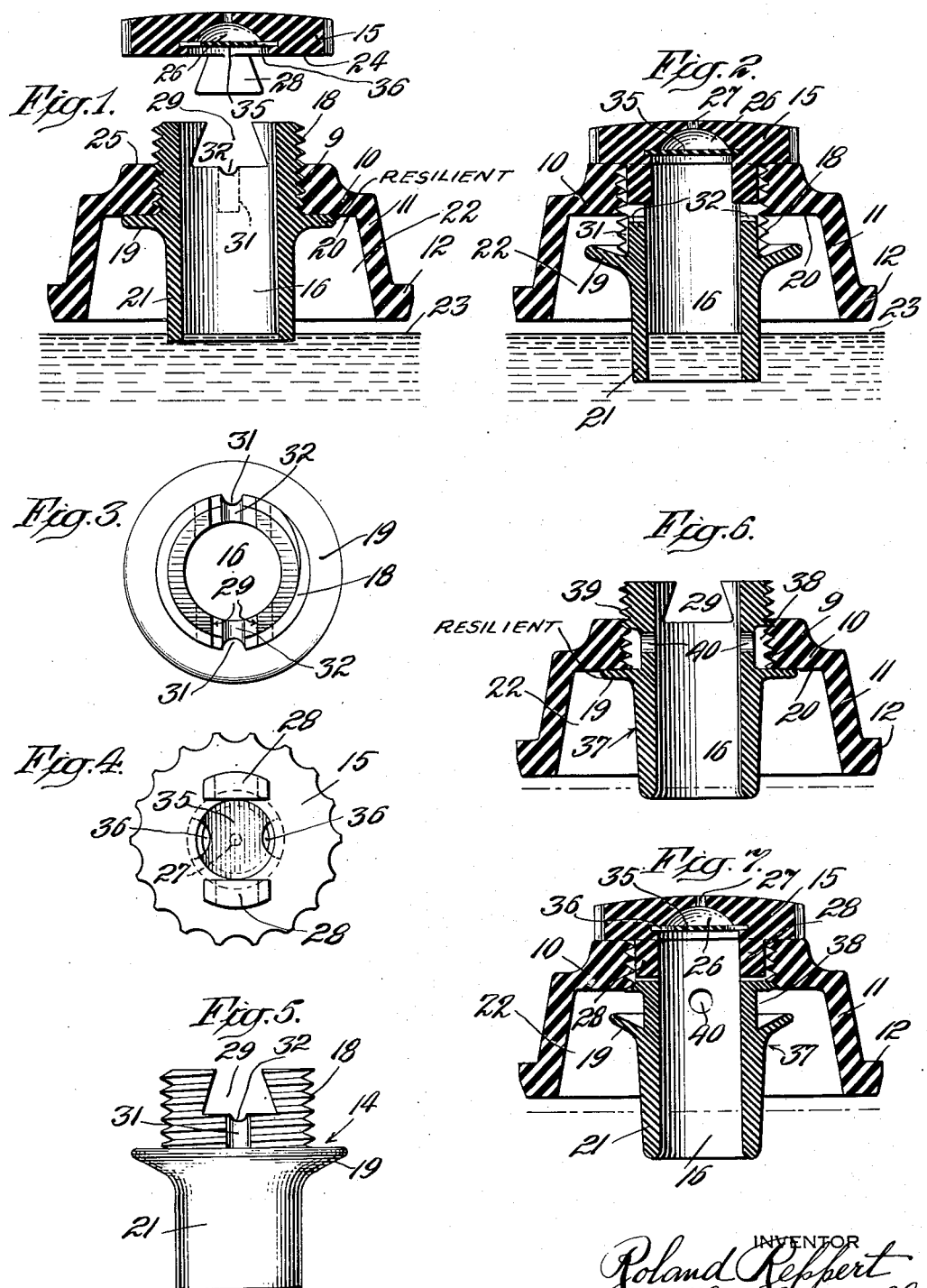

2,276,091

UNITED STATES PATENT OFFICE 2,276,091

CLOSURE FOR BATTERY BOX COVERS

Roland Reppert, Pelham Manor, N. Y., assignor to American Hard Rubber Company, New York, N. Y., a corporation of New York Application March 23, 1939, Serial No. 263,578

2 Claims. (Cl. 136—178)

The invention relates to an improvement in closures or closure devices for the filling or vent hole of covers for battery boxes for automobiles and the like.

The closure devices of battery box covers are usually constructed to perform the double function of permitting the introduction of liquid into the battery box while shutting off the vent openings from the interior of the battery box, so that the electrolyte will not rise beyond a predetermined level or point in the battery box; and, when the battery is in operation, of permitting the escape of air or gases from the interior of the battery box, while preventing the escape of electrolyte therefrom. Closure devices have heretofore been provided for performing these functions. Some of these prior devices have operated more or less satisfactorily, but the cost of manufacture of the more efficient devices has been excessive. On the other hand, the cheaper closure devices have, on the whole, operated unsatisfactorily, for one reason or another.

The object of the present invention is to provide for use with battery box covers, a closure device of such novel construction that it may be manufactured comparatively cheaply and yet will perform the functions required of it satisfactorily. To this end the invention consists in the novel closure or closure device hereinafter fully described and particularly pointed out in the appended claims.

In the accompanying drawing illustrating the preferred form of the invention, Fig. 1 is a vertical, longitudinal section through the improved closure device, the valve sleeve being shown in position in the filling or vent hole of the battery box cover, permitting the introduction of liquid into the battery box, and the vent cap being shown separated from the valve sleeve; Fig. 2 is a view similar to Fig. 1, but showing the parts of the closure device in position permitting air and gases to escape from the interior of the battery box, while preventing the escape of liquid therefrom; Fig. 3 is a top plan view of the valve sleeve; Fig. 4 is a bottom plan view of the vent cap; Fig. 5 is a side elevation of the valve sleeve; Fig. 6 is a vertical, longitudinal section similar to the lower part of Fig. 1, of a modified form of valve sleeve in place in the battery box cover permitting introduction of liquid into the battery box; and Fig. 7 is a view similar to Fig. 2, of the modified form of closure device shown in Fig. 6, in position permitting escape of gases from the battery box.

In the illustrated form of battery box cover, the filling and vent aperture is formed as a threaded hole 9 in the top 10 of the cover 11, the flange portions of which are indicated at 12. It will be understood that the improved closure device of the present invention is not to be restricted to use with the particular form of battery box cover shown in the drawing, but may be used with any preferred form, provided it has a threaded filling and vent aperture.

The improved closure device for battery box covers shown in Figs. 1 to 5, comprises two cooperating elements, a valve sleeve generally indicated at 14, and a vent cap 15. When the valve sleeve 14 is separate from the vent cap 15 and occupies the position in the cover 11 indicated in Fig. 1, liquid may be introduced into the battery box up to a predetermined level and no more; and when the valve sleeve and the vent cap are connected together and occupy the positions in the cover 11 indicated in Fig. 2, the battery may be placed in operation and the air and gases will escape from the interior of the battery box without the loss of electrolyte.

The valve sleeve 14 is formed as a hollow structure, conveniently a cylinder having a central bore 16 throughout its length. The outer surface of the valve sleeve is divided into three parts, the upper part 18 being threaded externally so as to screw upwardly into the internally threaded hole 9 in the cover 11. At about its middle portion the valve sleeve 14 is provided with a circumferential, upwardly flaring flange or collar 19 which is arranged to engage snugly the under surface 20 of the top 10 of the cover 11 and thereby form an air-tight joint or seal with it to prevent the passage of air at this point from the interior of the battery box during the filling operation, as shown in Fig. 1. In order that the collar 19 may the more readily and effectively form an air-tight joint with the under surface 20 of the top of the cover 11, it is composed of a resilient material, such as soft rubber, and the lower part 21 of the valve sleeve 14 is, for the sake of convenience of manufacture, also composed of soft rubber, although it may be composed of other material connected or associated with the collar 19. The upper threaded end 18 of the valve sleeve 14 is also connected or associated with the soft rubber collar 19, and is composed of hard rubber, although it may be composed of other hard, acid-resistant material connected with the resilient collar 19. The lower end 21 of the sleeve 14 extends downwardly into the electrolyte-containing interior of the battery box and its lower extremity predetermines the level to which the electrolyte can rise in the battery box.

To place the sleeve-like valve member 14 in operative position in the battery box cover 11 so that liquid may be introduced into the battery box up to a predetermined level, the valve member is screwed upwardly into the threaded filling and vent hole 9 until the compressible collar 19 is screwed snugly against the lower surface 20 of the top 10 of the cover 11. When the valve sleeve is in this position, preventing air or gas from passing from the interior of the battery box through the joint between the valve sleeve and the cover 11, liquid may be introduced into the battery box up to the level 23, which is about coincident with or slightly above the lower extremity of the valve sleeve. The battery electrolyte is then at the proper level for operation. The space 22 surrounding the lower end of the sleeve 14 and extending from the under surface of the cover down to the level of the lower extremity of the sleeve constitutes an air and gas receiving chamber when the battery box is filled with electrolyte up to the level 23.

In order that the battery may operate properly, the gas formed during the operation of the battery, and which accumulates in the space 22, is permitted to escape from the interior of the battery box while the electrolyte is prevented from slopping out. For this purpose the vent cap 15 is connected with the upper end of the valve sleeve and the two parts are turned down into the position shown in Fig. 2. The vent cap 15 is a disk-like member having a flat under surface 24 permitting it to fit tightly on the flat upper surface 25 of the top 10 of the cover 11. The center of the underside of the vent cap is provided with a recess 26 adapted to register with the central bore 16 of the valve sleeve and the center of the top of the vent cap is provided with the restricted aperture or vent hole 27 communicating with the recess 26. Projecting downwardly from the under surface 24 of the vent cap 15 and located at the sides of the recess 26 are two lugs 28, dove-tail in shape, adapted to be loosely received in the dove-tail openings 29 formed in the sides of the upper end of the valve sleeve. The lugs 28 are slid transversely into the opening 29 and when the vent cap 15 is in alinement with the valve sleeve, the turning of the vent cap inwardly or downwardly causes the valve sleeve to unscrew and descend downwardly into the battery box, as shown in Fig. 2, until the under surface 24 of the vent cap is in contact with the upper surface 25 of the top 10 of the cover 11. In this position of the parts, the vent grooves or apertures 31 formed longitudinally in the lower end of the threaded periphery 18 of the upper end of the valve sleeve, and the vent grooves 32 formed transversely in the bottom of the dove-tail openings 29, are brought into communication with the gas-receiving space 22 surrounding the valve sleeve, thereby permitting the gas to escape through the grooves into the bore 16, up through the recess 26 and out through the vent hole 27. To prevent electrolyte from escaping with the gas a diaphragm 35 is interposed in the recess 26 and its opposite edges are provided with the apertures or notches 36.

The form of valve sleeve shown in Fig. 5 can be inserted in the threaded hole in the cover only from the bottom side thereof. It is sometimes convenient to be able to insert the valve sleeve either from the bottom side of the cover or from the top side, and for this purpose, I have provided the modified form of valve sleeve shown in Figs. 6 and 7. In its main features the modified valve sleeve, indicated generally at 37 in Figs. 6 and 7, is the same as the valve sleeve shown in Figs. 1 to 5, and the corresponding parts are given the same reference numerals. The modification consists in forming a groove 38 in the base of the threaded upper end 39 of the valve sleeve just above or adjacent to the resilient collar 19; the groove 38 is wide and deep enough to receive the resilient collar 19 to permit it and the lower end 21 of the valve sleeve to pass or be forced downwardly through the threaded opening 9 in the top 10 of the battery box cover 11. The form of valve sleeve shown in Figs. 6 and 7 may, of course, be inserted into the threaded hole in the cover from the under surface of the top 10 thereof, the same way in which the valve sleeve shown in Fig. 5 is inserted in the threaded hole of the cover. In the operation of inserting the modified form of the valve sleeve downwardly through the upper surface of the cover 11, the lower end 21 of the sleeve may be slightly compressed and forced into the threaded hole 9 until the resilient collar 19 is reached. With sufficient pressure the collar 19 will fold against the bottom of the groove 38 and the valve sleeve forced downwardly into the threaded hole 9 until the bottom of the threaded upper end 39 of the valve sleeve is reached. Thereupon, the valve sleeve will be turned inwardly or downwardly until the resilient collar 19 is free from the under side of the threaded hole in the cover, and is permitted to expand into its normal condition, as shown in Fig. 7. The valve sleeve 37 will then be turned in the reverse direction, withdrawing the valve sleeve outwardly and upwardly in the cover 11 until the resilient collar 19 is brought snugly up against the under surface 20 of the top 10 of the cover 11, as shown in Fig. 6. In this position of the valve sleeve 37, the battery box may be supplied with liquid up to the predetermined level. The vent cap 15 will then be engaged with the slotted upper end of the valve sleeve, and then the two will be turned into the position shown in Fig. 7 to permit escape of the gases. In this form of the invention, the vent apertures in the sleeve consist of a plurality of radial holes 40 piercing the upper end of the valve sleeve at the bottom of the groove 38. It will be observed that when the valve sleeve 37 is in the position shown in Fig. 7, the vent apertures 40 are in communication with the gas-receiving space 22 surrounding the valve sleeve, and accordingly, when in this position the modified form of the invention shown in Figs. 6 and 7, operates exactly like the form of the invention shown in Figs. 1 to 5.

Having thus described the invention, what I claim as new is:

1. A closure device for a battery box adapted to contain electrolyte up to a predetermined level with a cover for the battery box having a threaded opening therein with a space between the top of the cover and the predetermined level of electrolyte in the battery box, comprising, a vertically-arranged sleeve having a bore throughout its length and an exterior consisting of a threaded upper end, a resilient collar below the thread and a lower end of substantial length below the collar, said lower end of the sleeve being insertable downwardly through the threaded opening in the cover, the upper end of the sleeve immediately above the collar being provided with a groove of sufficient depth to receive the collar to permit the collar to be inserted through the threaded opening in the cover from the upper surface thereof for threadedly engaging the upper end of the sleeve with the threaded opening in the cover, there being vent openings extending from the groove into the bore of the sleeve, the arrangement being such that when the sleeve is located in its uppermost position in the opening in the cover with the collar forming a tight joint with the under side of the cover, the lower end of the sleeve projects downwardly to the predetermined level of the electrolyte in the electrolyte-containing part of the battery box, and a removable vent cap for closing the upper end of the bore in the sleeve and having vent passages adapted to register with the bore in the sleeve, the upper end of the sleeve and vent cap having separable inter-engaging parts whereby by turning the cap in one direction, the sleeve may be moved downwardly to bring the vent openings therein into communication with the space surrounding the lower end of the valve sleeve through the space between the cover and the collar.

2. A closure device for a battery box cover having an aperture therein and adapted to contain electrolyte up to a predetermined level, comprising, a vertically arranged sleeve having a bore throughout its length and an exterior consisting of a resilient collar larger in diameter than the aperture in the cover and a lower end of substantial length below the collar insertable in the aperture through the cover, there being a gas-receiving space between the under surface of the cover and the electrolyte level and surrounding the lower end of the sleeve, the part of the sleeve above the collar and the aperture in the cover having cooperating means whereby the sleeve may be moved vertically to have an upper position with the collar against the under surface of the cover and a lower position with the collar free from the cover, the part of the sleeve immediately above the collar being provided with a groove of sufficient width and depth to receive the collar to permit the collar to be inserted through the aperture in the cover from the upper surface thereof, there being vent openings extending from the bottom of the groove into the bore of the sleeve, and a removable vent cap for closing the upper end of the bore in the sleeve and having vent passages adapted to register with the bore, the upper end of the sleeve and the vent cap having separable inter-engaging parts, whereby when the cap is moved in one direction the sleeve is moved downwardly to bring the vent openings therein into communication with the gas-receiving space and when the vent cap is moved in the opposite direction the sleeve is moved upwardly to bring the collar into engagement with the under surface of the cover.

ROLAND REPPERT.